(12) United States Patent
Balmakhtar et al.

(10) Patent No.: US 11,288,175 B1
(45) Date of Patent: Mar. 29, 2022

(54) SOFTWARE PRODUCTION LOAD AND SOFTWARE TEST LOAD SYNCHRONIZATION FEEDBACK SYSTEM

(71) Applicant: T-MOBILE INNOVATIONS LLC, Overland Park, KS (US)

(72) Inventors: Marouane Balmakhtar, Fairfax, VA (US); Serge M. Manning, Plano, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/897,457

(22) Filed: Jun. 10, 2020

(51) Int. Cl.
 *G06F 11/36* (2006.01)
 *G06F 8/71* (2018.01)
 *H04L 9/32* (2006.01)
 *G06F 9/445* (2018.01)
 *G06F 12/02* (2006.01)
 *G06F 16/14* (2019.01)

(52) U.S. Cl.
 CPC .......... *G06F 11/3688* (2013.01); *G06F 8/71* (2013.01); *G06F 9/445* (2013.01); *G06F 12/0276* (2013.01); *G06F 16/148* (2019.01); *H04L 9/3247* (2013.01); *H04L 9/3297* (2013.01); *G06F 2212/702* (2013.01)

(58) Field of Classification Search
 CPC ...... G06F 11/3688; G06F 16/148; G06F 8/71; G06F 9/445; G06F 12/0276; G06F 2212/702; H04L 9/3247; H04L 9/3297
 See application file for complete search history.

(56) References Cited

U.S. PATENT DOCUMENTS

| | | | |
|---|---|---|---|
| 7,739,680 B1* | 6/2010 | Thakur | G06F 8/656 717/172 |
| 8,418,000 B1* | 4/2013 | Salame | G06F 11/263 714/38.1 |
| 9,395,979 B1* | 7/2016 | Bullukian | G06F 8/71 |
| 10,831,877 B1* | 11/2020 | Al-Gharaibeh | H04L 63/083 |

(Continued)

OTHER PUBLICATIONS

Salamat et al. "Orchestra: Intrusion Detection Using Parallel Execution and Monitoring of Program Variants in User-Space." 2009, [Online], pp. 33-46, [Retrieved from internet on Nov. 16, 2021], <https://dl.acm.org/doi/pdf/10.1145/1519065.1519071> (Year: 2009).*

*Primary Examiner* — S. Sough
*Assistant Examiner* — Zengpu Wei

(57) ABSTRACT

A method of testing production server applications. The method comprises monitoring a production server that is executing a first version of a production application by an agent application executing on the production server, recording changes made on the production server by the agent application in a reporting file on the production server, launching a test application on a test server, wherein the test application is associated with a second version of the production application, in response to launching the test application, reading the reporting file by a script executing on the test server, determining by the script that changes were made on the production server based on reading the reporting file, and sending by the script a notification about the changes made on the production server, whereby a tester testing the second version of the production application is made aware of changes that have been made on the production server.

20 Claims, 6 Drawing Sheets

(56) References Cited

U.S. PATENT DOCUMENTS

| | | | |
|---|---|---|---|
| 2008/0126773 A1* | 5/2008 | Martinez | G06F 21/57 |
| | | | 713/1 |
| 2008/0172431 A1* | 7/2008 | Stephens | G06F 12/0253 |
| 2012/0033562 A1* | 2/2012 | Gruber | H04L 43/50 |
| | | | 370/252 |
| 2017/0097882 A1* | 4/2017 | Chakraborty | G06F 11/3684 |
| 2018/0367434 A1* | 12/2018 | Kushmerick | H04L 43/14 |
| 2020/0233648 A1* | 7/2020 | Bonas | G06Q 30/0641 |
| 2021/0058303 A1* | 2/2021 | Bonaventura | H04L 41/5067 |
| 2021/0117310 A1* | 4/2021 | Lu | G06F 11/362 |

\* cited by examiner

SOFTWARE PRODUCTION LOAD AND SOFTWARE TEST LOAD SYNCHRONIZATION FEEDBACK SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer applications may perform mission critical functions for some enterprises. If the computer applications experience a failure or error, service to customers of the enterprise can be degraded and may damage a valuable relationship established between the customer and the enterprise. If the computer applications experience a failure or error, the enterprise may lose significant revenue. Accordingly, it is desirable to thoroughly test and qualify a new version of a computer application in a test environment before deploying the computer application to a customer affecting production environment. A new version of a computer application is a derivation of a previous version of the computer application that has been changed in some way. There is a significant risk of introducing errors—"bugs"— into computer applications when modifying them, because developing computer applications and changing computer applications is typically conducted by a human being, and human beings are subject to making errors.

SUMMARY

In an embodiment, a method of maintaining production server applications is disclosed. The method comprises monitoring editing operations on a first production server that is executing a first version of a production application, whereby edits made on the first production server are automatically recorded in a log file stored on the first production server, determining parameters on the first production server by an agent application that executes on the first production server, and storing the parameters by the agent application in a reporting file stored on the first production server. The method further comprises launching a test application on a test server, wherein the test application is associated with a second version of the production application, in response to launching the test application, reading the log file and the reporting file by a script executing on the test server, based on identifying by the script an entry in the log file, sending by the script a notification about the entry in the log file, and, based on determining by the script that a parameter in the reporting file has changed, sending by the script a notification about the change in the parameter. The method further comprises storing the second version of the production application in a second production server, where the outputs of the second production server are initially decoupled from production, executing the second version of the production application on the second production server, feeding production inputs to the second version of the production application, analyzing a log file of the second production server, and, after analyzing the log file of the second production server, coupling the outputs of the second production server to production.

In another embodiment, a method of testing production server applications is disclosed. The method comprises monitoring a production server that is executing a first version of a production application by an agent application executing on the production server, recording changes made on the production server by the agent application in a reporting file on the production server, and launching a test application on a test server, wherein the test application is associated with a second version of the production application. The method further comprises, in response to launching the test application, reading the reporting file by a script executing on the test server, determining by the script that changes were made on the production server based on reading the reporting file, and sending by the script a notification about the changes made on the production server, whereby a tester testing the second version of the production application is made aware of changes that have been made on the production server.

In yet another embodiment, a method of deploying server applications to a production execution environment, comprising, loading a server application onto a server computer, and feeding production inputs to the server computer. The method further comprises executing the server application on the server computer based on the production inputs while maintaining the outputs of the server computer decoupled from production outputs, analyzing a log file by a script executing on the server computer, where the log file is generated by the server application, determining by the script based on analyzing the log file that the server application is qualified for deployment to a production execution environment, and coupling the outputs of the server computer to production outputs by the script.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
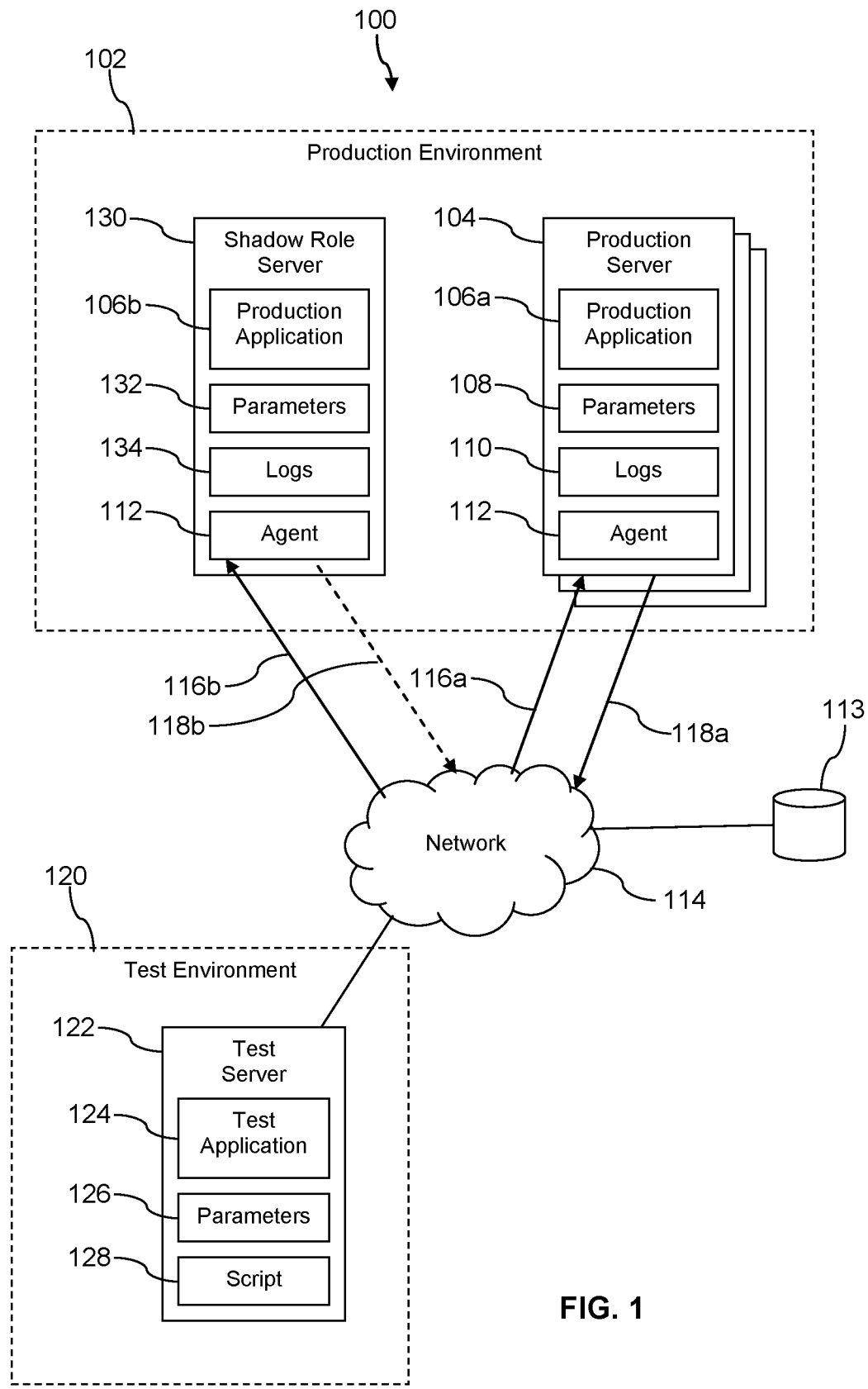
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An enterprise may operate a production suite of computers or servers that execute enterprise applications that carry on the business of the enterprise—for example, provisioning wireless communication services for wireless service subscribers, authenticating mobile communication devices for access to a radio access network (e.g., to place voice calls and data calls via cell sites), providing a mobile communication device on-line store, and other enterprise services. In some contexts, these enterprise applications may be referred to as "mission critical" applications in that if they break or crash, customer service and business revenue may be affected. The production servers may be said to constitute a production computing environment, and the enterprise applications executing on the production servers may be said to execute in a production environment. To avoid problems with the production servers, new versions of software or of applications desirably are thoroughly tested in a test environment before a new version of an application is deployed to the production environment. In the test environment, the enterprise application is executed using test inputs, and the output of the enterprise application is not connected with live customer traffic. Said in other words, the operations in the test environment are not customer impacting. When a new version of an application has been tested, it is deemed ready for production and is loaded onto an available production server and put into service. The new version of the application transferred from the test environment to the production environment is officially under configuration control and there are not supposed to be any differences between the final tested version of the application tested in the test environment and the application executing in the production environment.

In fact, however, the commonly accepted idea that the production application is fixed and unchanging once released from the test environment and deployed to the production environment is wrong: changes do get made to the application and/or the operating system in the production environment. For example, operating system parameters may be adapted as the transactions load on the application executing on the production servers changes. For example, the number of communication connections per second that the application can do may be increased, the memory size allocated to the application may be changed, various operating system kernel parameters may be optimized, a patch may be applied to the operating system. If the next version of the application is built on the baseline of the application as last deployed from the test environment to the production environment it may not have the adaptations that have been made in the production environment since the initial release of the previous version of the application. The consequence is that the next layer of development is produced on top of a baseline which is inconsistent with the current production application. Thus, when the new version is tested it is being tested in an environment that does not properly reflect the current production environment (e.g., lacks the current operating system parameters used in the production environment). When the next version of the application is deployed to the production environment, these unrecorded production adaptations get wiped out, often to the detriment of the execution of the production servers or the new version of the application doesn't function correctly.

The present disclosure teaches a system that provides for a mutually supporting feedback loop: from production back to test, from test to a "shadow role" software load deployment, from the "shadow role" deployment to production. This system overcomes the problem with unrecorded production environment changes not flowing into the next development cycle. A monitor or agent executing in the production environment detects when a change is made to the production application and/or to the operating system of the production server(s) and stores a record of the change in a centrally accessible database. When automated testing of a new version of an application is launched in the test environment, the automated testing tool checks the database for records of production changes before testing. If such changes have occurred, a notification is provided to stake holders, for example an email is sent to members of a testing team and/or a leader of the testing team responsible for testing the subject new version of the application. The stake holders may then adapt the test load and/or the test environment accordingly. For example, the test team may modify the operating system parameters in the test environment to match the operating system parameter values in the production environment or make another adaptation in the test environment to make the test environment mirror more accurately the production environment.

When a version of the application has cleared testing and is headed for the production environment, it is first executed in a "shadow role" in the production environment. This can be visualized as the new software load of the application running on a production server, receiving production inputs, but outputting not to production workflows but instead to logs or to an application that compares the outputs to a canonical output, for example output produced by the old software load of the application running on a production server. When sufficient confidence is developed, based on the performance in the "shadow role," the new version of the application (e.g., the new software load) can be "cut over" to handle full production processing (e.g., piping the outputs of the new version of the application to the production workflows). The advantage of this kind of "shadow role" execution is that executing the new version of the application in the "shadow role" can provide a more realistic execution environment (e.g., more closely similar to the production environment) than is provided by the test environment. Executing the new version of the application in the "shadow role" essentially tests the new load in the most accurate way possible (e.g., most similar to the actual production environment). In an embodiment, the process of comparing the outputs of the new version of the application executing in a shadow role to the outputs of the previous version of the application executing in the production environment can be performed by an application or script. This application or script can autonomously decide to cut over the new version of the application, transitioning its execution from a "shadow role" to a full-production role.

It is understood that benefits can also be provided by implementing portions of the system described above. For example, implementing the "shadow role" testing described above without the use of the feedback loop from the production environment to the test environment can provide benefits. For example, implementing the feedback loop from the production environment to the test environment without the use of the "shadow role" testing can provide benefits.

The system taught herein is a computer and/or information technology (IT) solution to a computer/IT problem. It is a particular solution to migrating a computer application from a test environment to a shadow execution role to a production environment with fewer failures and disruptions in customer-facing service than have been experienced in the past, where the application comprises modifications of the programmed interactions of the computer systems involved.

Turning now to FIG. 1, a system 100 is described. In an embodiment, the system 100 comprises a production environment 102 that comprises one or more production server computers 104 each executing a first version of a production application 106a based on parameters 108. The parameters 108 may be operating system kernel parameters or configuration data, operating system parameters, and/or application configuration parameters. The parameters 108 may comprise a heap memory allocation for the production server 104. The parameters 108 may comprise a maximum number of communication connections the production server 104 can open. The parameters 108 may comprise garbage collection settings. The parameters 108 may be optimized, adapted, or otherwise changed after deployment of the first version of the production application 106a to the production environment 102, for example in response to changing transactions loads being placed upon the production servers 104 as the business of an enterprise evolves over time. While not shown in FIG. 1, the first version of the production application 106a may execute in the context of an operating system, and that operating system too may evolve over time, for example as patches to the operating system are applied over time. The production environment 102 may comprise any number of production servers 104.

The production server 104 may execute the first version of the production application 106a by feeding inputs 116a received from a network 114 and return processed outputs 118a to the network. The inputs may be requests and/or messages from other systems or users. For example, the inputs 116a may be requests to provision a mobile communication device to receive wireless service. The inputs 116a may be requests to pay a bill. The inputs 116a may be requests for content. The outputs 118a may be request status responses. The outputs 118a may be content requested.

The production server 104 may also comprise logs 110 and an agent application 112. When actions are taken on the production server 104, for example edits, these actions may be recorded in the logs 110. The agent application 112 may periodically read through the logs to learn of and to monitor actions taken on the production server 104. The agent application 112 may write information gleaned from reading the logs to a data store 113 via a network 114, for example reports of changes to the production server 104 that the agent application 112 has identified in the logs 110. The agent application 112 may further take snapshots of the parameters 108 and/or determine a digital signature over the operating system, for example by determining a checksum over the operating system or over components of the operating system. The agent application 112 may store these snapshots and digital signatures in the data store 113. The agent application 112 may create a timestamp and associate it to each of the snapshots and store the snapshots and associated timestamps in the data store 113. The agent application 112 may store a last modified date for the file or files over which the digital signature is taken and store this in association with the digital signature in the data store 113. The agent application 112 may capture the snapshots of the parameters 108 and/or determine the digital signatures periodically, for example daily, weekly, or monthly. The network 114 comprises one or more public networks, one or private networks, or a combination thereof.

The system 100 further comprises a test environment 120 coupled to the network 114. The test environment 120 comprises one or more test servers 122, where each test server 122 comprises a test application 124, parameters 126, and a script 128. The test application 124 may be a new version of the first version of the production application 106a. It is understood that the test application 124 may be modified during an on-going testing process many times before it reaches a final approved form and is deemed ready for propagation to the production environment 102 as a second version of the production application 106b. The test application 124 is executed while feeding test inputs into the test application 124 and analyzing the outputs of the test application 124. The testing of the test application 124 may be conducted by performing a sequence of test cases, where each test case defines a set of one or more inputs and a set of one or more outputs that are associated with the specific inputs. If the test application 124, when provided the inputs defined in the test case, produces the expected outputs defined in a test case, the test case may be deemed to be passed; if the test application 124, when provided the inputs defined in the test case, produces outputs different from the outputs defined for the test case, the test case is deemed failed.

The test application 124 executes on the test server 122 based at least in part on the parameters 126. The parameters 126 may be operating system kernel parameters or configuration data, operating system parameters, and/or application configuration parameters. In an embodiment, the parameters 126 may be the same as the parameters 108 associated with the first version of the production application 106a at the time that first version of the production application 106a was released to the production environment 102. It is common when developing a next version of an application to start from the baseline of the previous version of the application when it was initially released, and the baseline typically includes the parameters 126 also. But as has been said above, sometimes the parameters 108 evolve and change after the deployment of the first version of the application 106a to the production environment 102, and hence the parameters 126 may differ from the parameters 108 in the production environment. This situation can cause the testing conducted in the test environment 120 to be misleading (e.g., one thinks one is testing the test application 124 in an environment as similar to the production environment 102 as possible, but in fact this is not the case because the parameters 108 and the parameters 126 are different). It is desirable to be aware that the parameters 108 and the parameters 126 are different so the testing team can make adjustments if needed.

The script 128, when executed, communicates to the data store 113 to analyze the reports of changes to the production server 104, to read the snapshots and digital signatures. The script 128 can analyze the reports, snapshots, and digital signatures to determine if changes have taken place in the production environment 102 (e.g., changes in the production server 104) and what those changes were. If the script 128 determines that the changes are potentially significant, the script 128 can notify the testing team, for example by sending an email notification identifying the changes determined to have taken place in the production environment 102. In response, the test team may modify the parameters 126 to make them agree with the current parameters 108 in the production server 104 or alter other artifacts in the test server 122 to match the corresponding artifacts in the production server 104, for example duplicating operating system patches or the like.

In an embodiment, the script 128 is automatically executed when a testing tool used to run the test cases is executed. Alternatively, the script 128 may be launched by a tester before beginning a test run. Because the parameters 108 and other aspects of the production server 104 can be changed at any time, the script 128 may be executed again at the completion of testing of the test application 124, whereby to assure that at the time of the completion of test, the final testing was conducted using parameters 126 and other artifacts in the test server 122 that were in agreement with corresponding parameters 108 and artifacts in the production server 104. In an embodiment, the script 128 may be executed automatically a plurality of times. For example, the script 128 may be executed continuously and log deltas (e.g., differences) between the test environment 120 and the production environment 102 (e.g., differences between the test application 124 and parameters 126 and the first version of the production application 106a and the parameters 108). Alternatively, the script 128 may be run periodically during the testing period, for example weekly, daily, twice per day, or another periodic interval.

In an embodiment, the production environment 102 further comprises a shadow role server 130. The shadow role server 130 comprises a second version of the production application 106b, parameters 132, and logs 134. The second version of the production application 106b may be similar to the first version of the production application 106a in that it generally provides the same functionality or service but is different in being an updated version of the same basic application. In some cases, the second version of the production application 106b provides new functionality or features not supported by the first version of the production application 106a. The second version of the production application 106b may be provided by the test application 124 that has completed testing in the test environment 120 and has been promoted to execution on the shadow role server 130. The parameters 132 may be substantially similar to the parameters 108. It is possible that the parameters 132 comprise at least one parameter that is not included in the parameters 108, for example in the case of introduction of a new function or feature in the second version of the production application 106b that was not present in the first version of the production application 106a.

In an embodiment, the second version of the production application 106b, when executing in the shadow role, receives inputs 116b that are substantially similar to the inputs 116a fed to the production server 104. A utility of the operating system may be invoked to copy the inputs 116a destined for the production server 104 and send those copied inputs as inputs 116b to the shadow role server 130. In an embodiment, port mirroring may be used to copy the inputs 116a to the production server 104 to the inputs 116b to the shadow role server 130. Alternatively, the second version of the production application 106b, when executing in the shadow role, receives inputs 116b that are played back from recordings of inputs 116a previously provided to the production server 104. In an embodiment, the inputs 116b are a copy of the inputs 116a fed to the production server 104, for example by using port mirroring or another manner of sending the same input stream 116a to both the production server 104 and to the shadow role server 130.

The outputs of the second version of the production application 106b are not provided back to the network 114 but are stored as logs 134 or fed to an analysis application. The outputs of the second version of the production application 106b and the logs 134 can be analyzed to determine if the second version of the production application 106b is executing successfully. Indications of problems or of failures may be application warnings or application errors written to the logs 134 by the second version of the production application 106b. Another indication of problems or failures may be output bit rates from the second version of the production application 106b below a pre-defined threshold rate. In an example, the predefined data throughput threshold is between 500 megabits per second data throughput and 2 gigabits per second data throughput. Other indications of problems or failures may be jitter and latency in the data throughput.

The shadow role server 130 may comprise the agent 112 that monitors for changes in the production application 106b, the parameters 132, and/or in an operating system associated with the shadow role server 130. The agent 112 may analyze the logs 134 while the second version of the production application 106b is executing in the shadow role, determine that the second version of the production application 106b has passed its shadow role testing, and autonomously and automatically change the operation role of the shadow role server 130 to a production server executing the second version of the production application 106b. This changing from shadow role to production role may be referred to as cutting over the shadow role server 130 to a production server. The cut over may be accomplished by providing inputs 116b to the shadow role server 130 (transitioning to a production server role) that are not duplicates or copies of the inputs 116a but independent inputs representing active traffic to be served by the second version of the production application 106b) and by piping the outputs of the production application 106b to provide production outputs 118b. The cut over may be performed in an atomic operation so that no transactions are inadvertently dropped or processed twice. When the shadow role server 130 has been cut over, the shadow role server 130 may then be deemed a production server 104. The system 100 provides an improved system for testing applications and for deploying them to the production environment 102. System 100 can help smooth the process of testing new versions of applications and deploying them to the production environment 102.

Figure 2A:
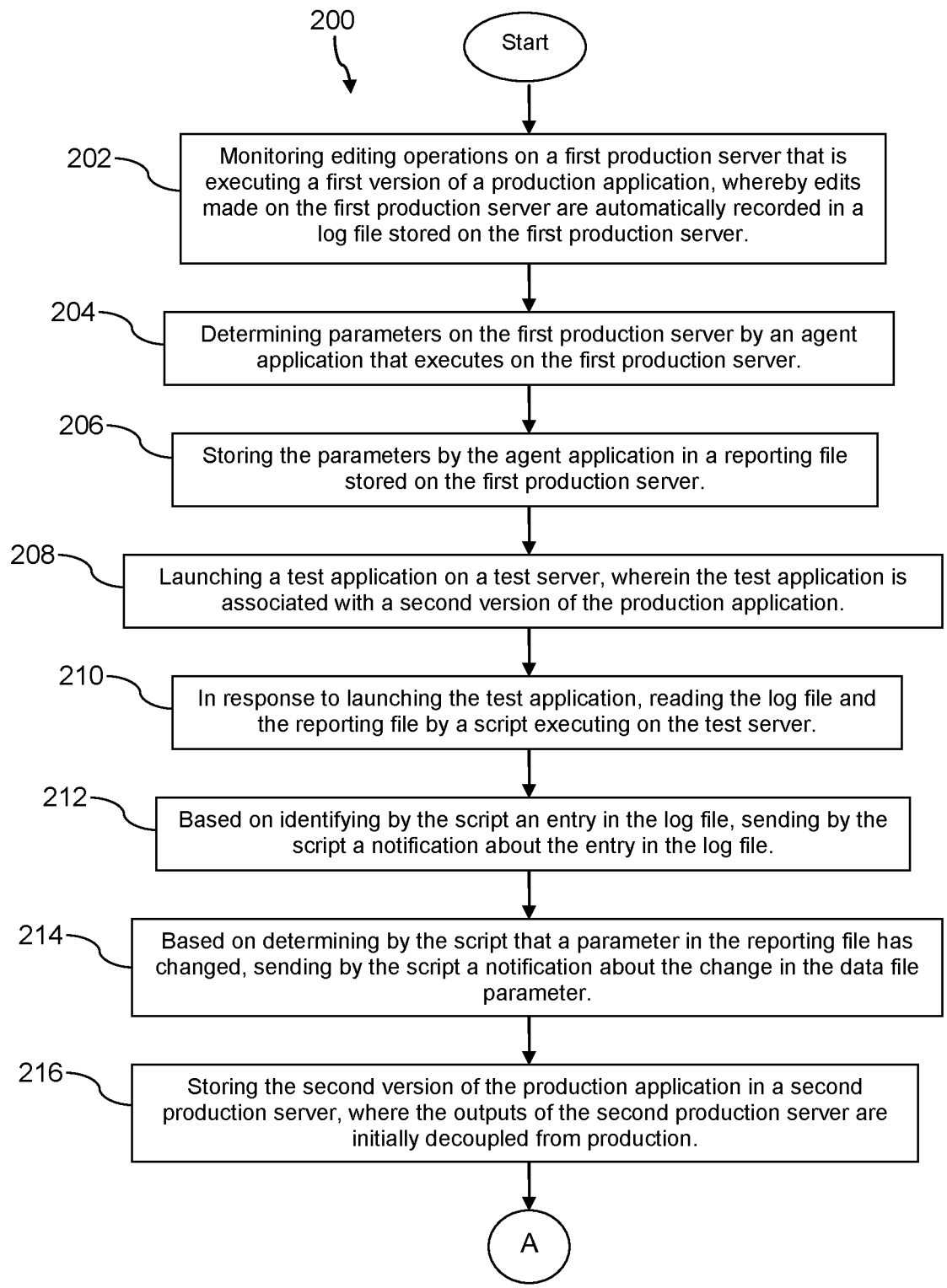
FIG. 2A and FIG. 2B are a flow chart of a method according to an embodiment of the disclosure.
Figure 2B:
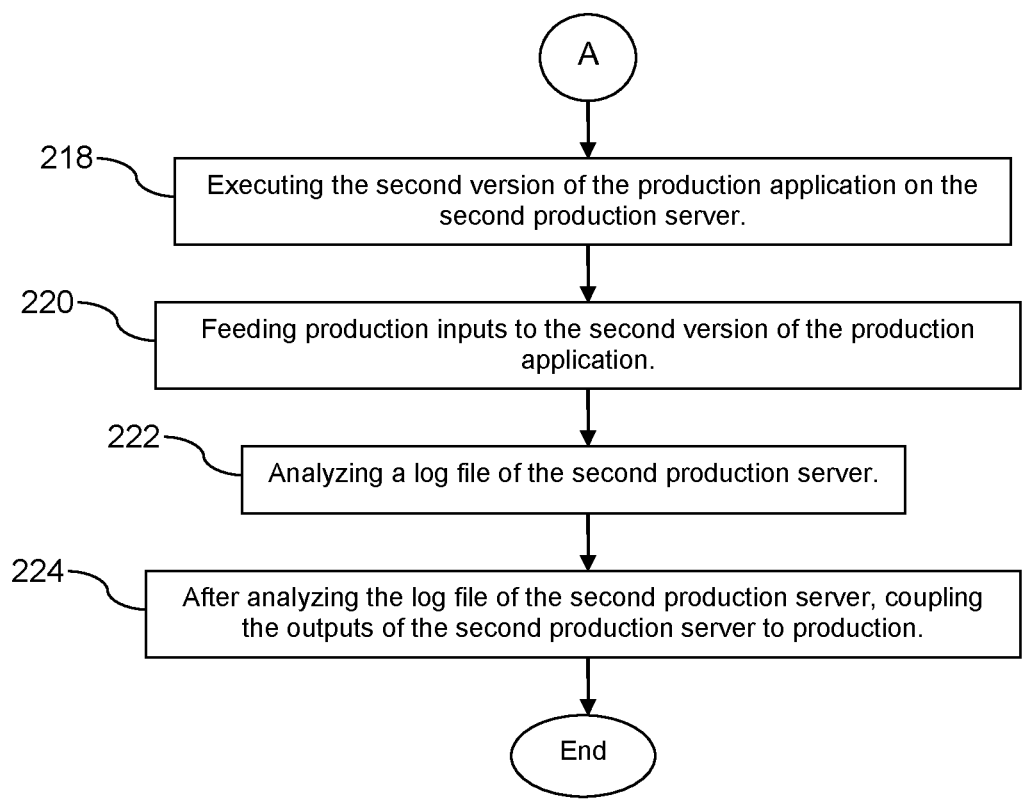

Turning now to FIG. 2A and FIG. 2B, a method 200 is described. In an embodiment, the method 200 is a method of maintaining production server applications. At block 202, the method 200 comprises monitoring editing operations on a first production server that is executing a first version of a production application, whereby edits made on the first production server are automatically recorded in a log file stored on the first production server.

At block 204, the method 200 comprises determining parameters on the first production server by an agent application that executes on the first production server. The processing of block 204 may comprise taking snapshots of the parameters of the first production server and generating a timestamp representing when the snapshot was captured. The processing of block 204 may comprise determining digital signatures, for example checksums, of the operating system and/or of other artifacts on the first production server.

At block 206, the method 200 comprises storing the parameters by the agent application in a reporting file stored on the first production server. In an embodiment, the parameters may comprise operating system parameters such as heap memory allocation and/or a maximum number of communication connections allocated for the first production server or for a first version of a production application executing on the first production server. In an embodiment, the agent application may store the reporting file in a data store separate from the first production server. In an embodiment, the processing of block 206 may comprise storing the snapshots associated with the timestamps in a reporting file on the first production server and/or in a data store separate from the first production server.

At block 208, the method 200 comprises launching a test application on a test server, wherein the test application is associated with a second version of the production application. In an embodiment, the script may be automatically launched on the test server when a test tool used to perform testing is executed. Alternatively, the script may be manually launched by an operator or tester.

At block 210, the method 200 comprises, in response to launching the test application, reading the log file and the reporting file by a script executing on the test server. The processing of block 210 may comprise the script analyzing the log file and the reporting file to determine if changes have been made to the first production server, for example changes to the operating system, changes to parameters or operating system parameters, or changes to other artifacts of the first production server. The processing of block 210 may comprise analyzing snapshots of parameters and associated timestamps to determine if changes have been made to the first production server. The processing of block 210 may comprise comparing digital signatures of the operating system executing on the first production server and/or digital signatures of other artifacts on the first production server to associated digital signatures created when a first version of the production application was first installed on the first production server, whereby to determine if the operating system on the first production server or other artifacts have changed since the initial deployment of the first version of the production application to the first production server.

At block 212, the method 200 comprises, based on identifying by the script an entry in the log file, sending by the script a notification about the entry in the log file. For example, the notification is sent to a tester, a test team leader, a program manager, or other. In an embodiment, the notification identifies a parameter change, an operating system change, or a change of another artifact in the first production server. At block 214, the method 200 comprises, based on determining by the script that a parameter in the reporting file has changed, sending by the script a notification about the change in the parameter.

At block 216, the method 200 comprises storing the second version of the production application in a second production server, where the outputs of the second production server are initially decoupled from production. At block 218, the method 200 comprises executing the second version of the production application on the second production server. At block 220, the method 200 comprises feeding production inputs to the second version of the production application. The second production server, in this configuration, may be said to be operating as a shadow role server. At block 222, the method 200 comprises analyzing a log file of the second production server. The processing of block 222 may comprise determining a data throughput rate and comparing it to a minimum pre-defined throughput threshold. The processing of block 222 may comprise searching the log file of the second production server for application warnings or application errors generated by the second production server and/or by a second version of a production application executing on the second production server. At block 224, the method 200 comprises, after analyzing the log file of the second production server, coupling the outputs of the second production server to production. The process of coupling the outputs of the second production server to production may be referred to as cutting over the shadow role server to a production server role.

Figure 3:
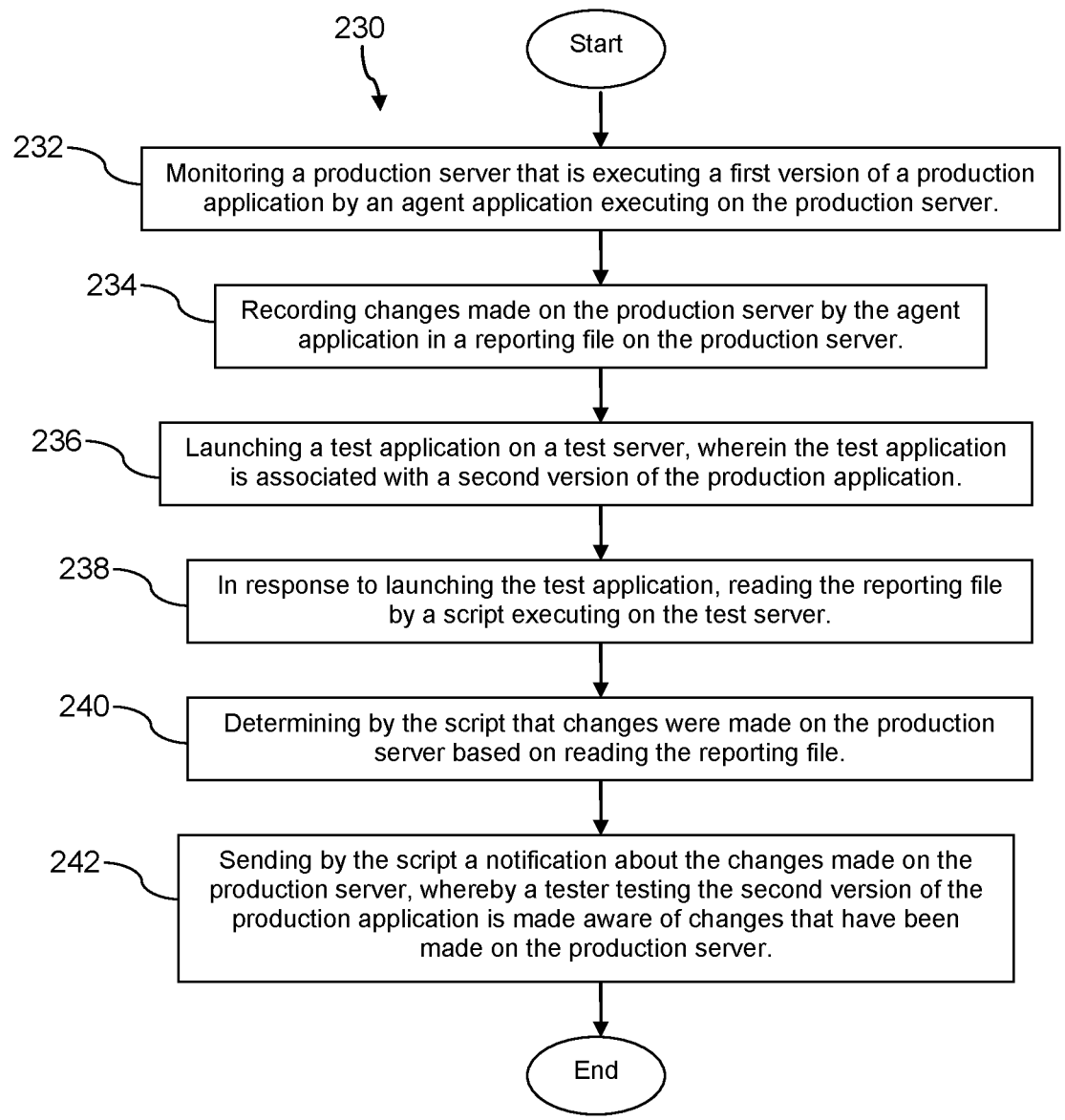
FIG. 3 is a flow chart of another method according to an embodiment of the disclosure.

Turning now to FIG. 3, a method 230 is described. In an embodiment, the method 230 is a method of testing production server applications. At block 232, the method 230 comprises monitoring a production server that is executing a first version of a production application by an agent application executing on the production server.

At block 234, the method 230 comprises recording changes made on the production server by the agent application in a reporting file on the production server. At block 236, the method 230 comprises launching a test application on a test server, wherein the test application is associated with a second version of the production application.

At block 238, the method 230 comprises, in response to launching the test application, reading the reporting file by a script executing on the test server. At block 240, the method 230 comprises determining by the script that changes were made on the production server based on reading the reporting file. At block 242, the method 230 comprises sending by the script a notification about the changes made on the production server, whereby a tester testing the second version of the production application is made aware of changes that have been made on the production server.

Figure 4:
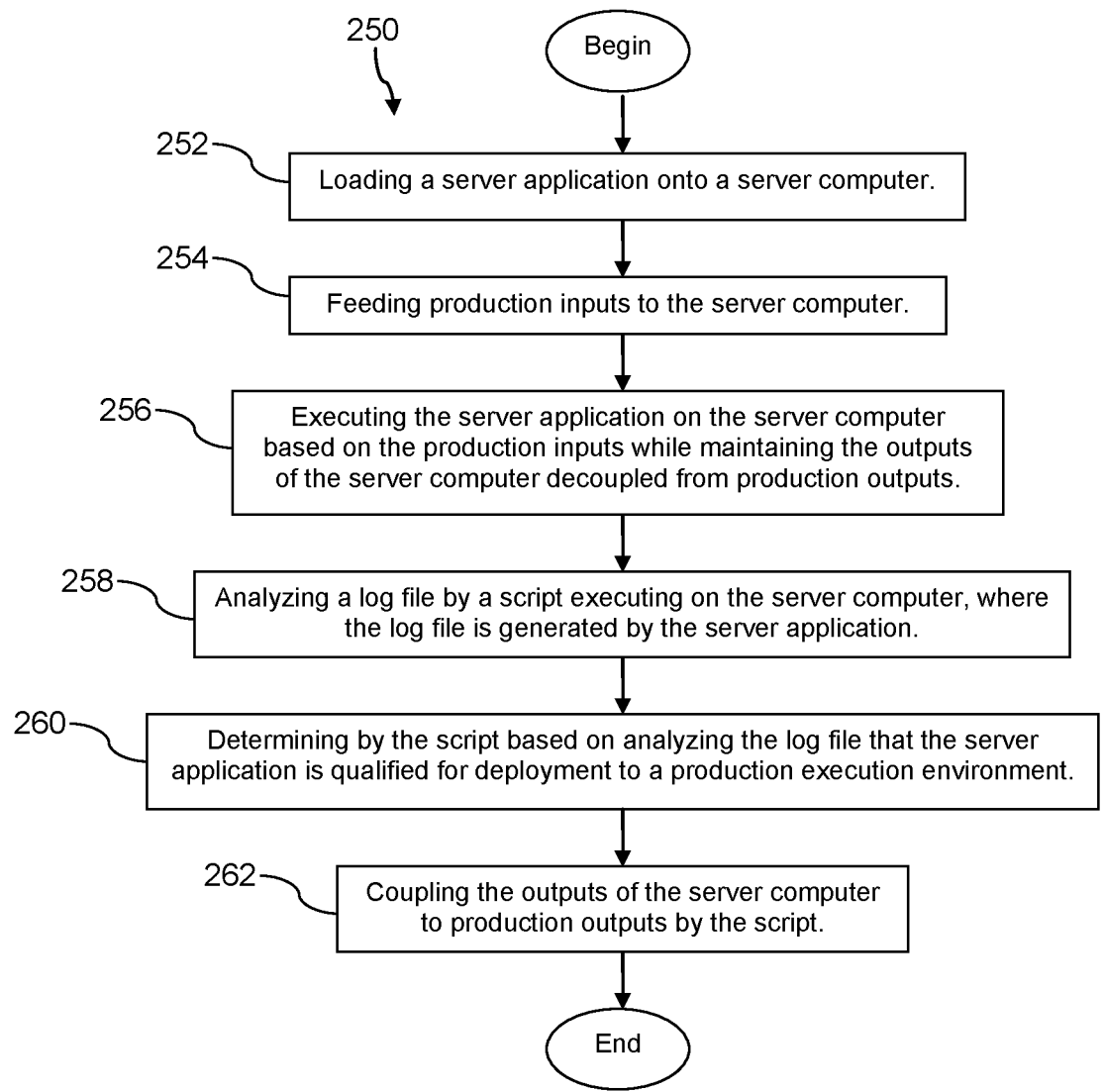
FIG. 4 is a flow chart of yet another method according to an embodiment of the disclosure.

Turning now to FIG. 4, a method 250 is described. In an embodiment, the method 250 is a method of deploying server applications to a production execution environment. At block 252, the method 250 comprises loading a server application onto a server computer.

At block 254, the method 250 comprises feeding production inputs to the server computer. At block 256, the method 250 comprises executing the server application on the server computer based on the production inputs while maintaining the outputs of the server computer decoupled from production outputs.

At block 258, the method 250 comprises analyzing a log file by a script executing on the server computer, where the log file is generated by the server application. At block 260, the method 250 comprises determining by the script based on analyzing the log file that the server application is qualified for deployment to a production execution environment. At block 262, the method 250 comprises coupling the outputs of the server computer to production outputs by the script.

Figure 5:
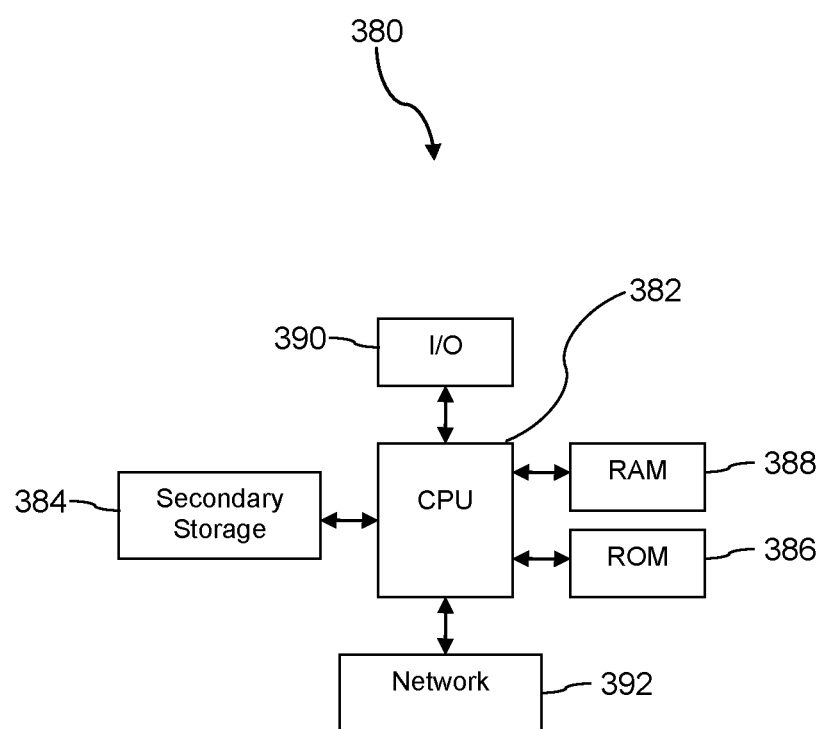
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of maintaining production server applications, comprising:
    monitoring editing operations on a first production server that is executing a first version of a production application, whereby edits made on the first production server are automatically recorded in a log file stored on the first production server;
    determining parameters on the first production server by an agent application that executes on the first production server, wherein the parameters reflect a production environment of the first production server;
    storing the parameters by the agent application in a reporting file stored on the first production server;
    launching a test application on a test server, wherein the test application is associated with a second version of the production application;
    in response to launching the test application, reading the log file and the reporting file by a script executing on the test server;
    based on identifying by the script an entry in the log file, sending by the script a notification about the entry in the log file;
    determining a change in the production environment of the first production server by determining by the script that a parameter in the reporting file has changed;
    based on the determining that the parameter in the reporting file has changed indicating the change in the production environment of the first production server, sending by the script a notification about the change in the parameter;
    in response to the notification about the change, modifying a testing environment of the test server to correspond with the change in the production environment of the first production server;
    storing the second version of the production application in a second production server, where outputs of the second production server are initially decoupled from production;

executing the second version of the production application on the second production server;

feeding production inputs to the second version of the production application;

analyzing a log file of the second production server; and after analyzing the log file of the second production server, coupling the outputs of the second production server to the production.

2. The method of claim 1, further comprising determining by the agent application a digital signature of an operating system on the first production server;

storing the digital signature of the operating system and a timestamp associated with the digital signature by the agent application in a data store;

reading the digital signature and associated timestamp and a previous digital signature and associated previous timestamp by the script from the data store;

comparing the digital signature and associated timestamp to the previous digital signature and associated previous timestamp by the script; and based on determining by the script that the digital signature and the previous digital signature are different, sending by the script a notification about a change in the digital signatures.

3. The method of claim 1, wherein the parameters comprise a heap memory allocation parameter.

4. The method of claim 1, wherein the parameters comprise a maximum number of communication connections parameter.

5. The method of claim 1, wherein the parameters comprise a garbage collection parameter.

6. The method of claim 1, wherein analyzing the log file of the second production server comprises searching the log file of the second production server for application warnings.

7. The method of claim 1, wherein analyzing the log file of the second production server comprises searching the log file of the second production server for application errors.

8. The method of claim 1, further comprising:

determining a data throughput of the outputs of the second production server to the production; and comparing the data throughput of the outputs of the second production server to a pre-defined throughput threshold.

9. A method of testing production server applications, comprising:

monitoring a production server that is executing a first version of a production application by an agent application executing on the production server;

determining parameters on the production server by the agent application, wherein the parameters reflect a production environment of the production server;

storing the parameters by recording changes made to the production environment on the production server by the agent application in a reporting file on the production server;

launching a test application on a test server, wherein the test application is associated with a second version of the production application;

in response to launching the test application, reading the reporting file by a script executing on the test server;

determining by the script that the changes were made to the production environment of the production server by determining that a parameter in the reporting file has changed; and based on the determining that the parameter in the reporting file has changed indicating the changes in the production environment of the production server, sending by the script a notification about the changes made to the production environment on the production server, whereby a tester testing the second version of the production application is made aware of the changes that have been made in the production environment on the production server, wherein a testing environment of the test server is modified in response to the notification to correspond with the changes made to the production environment on the production server, and wherein the test application is executed in the modified testing environment of the test server.

10. The method of claim 9, wherein recording changes by the agent application comprises determining digital signatures over an operating system of the production server and storing each of the digital signatures with an associated timestamp in the reporting file.

11. The method of claim 9, wherein recording changes by the agent application comprises capturing snapshots of parameters on the production server and storing each of the snapshots with an associated time stamp in the reporting file.

12. The method of claim 9, wherein the changes made in the production environment on the production server comprise changing a heap memory allocation parameter.

13. The method of claim 9, wherein the changes made in the production environment on the production server comprise changing a maximum number of communication connections parameter of the production server.

14. The method of claim 9, wherein the changes made in the production environment on the production server comprise changing a memory garbage collection parameter.

15. A method of deploying server applications to a production execution environment, comprising:

loading a server application onto a server computer;

feeding production inputs to the server computer;

executing the server application on the server computer based on the production inputs while maintaining outputs of the server computer decoupled from production outputs;

analyzing a log file by a script executing on the server computer, where the log file is generated by the server application;

determining by the script based on analyzing the log file that the server application is qualified for deployment to a production environment;

coupling the outputs of the server computer to the production outputs by the script;

determining parameters on a production server by an agent application that executes on the production server, wherein the parameters reflect the production environment of the production server;

storing the parameters by the agent application in a reporting file stored on the production server;

launching a test application on a test server, wherein the test application is associated with a second version of the server application;

in response to launching the test application, reading the reporting file by a script executing on the test server;

determining a change in the production environment of the production server by determining by the script executing on the test server that a parameter in the reporting file has changed;

based on the determining that the parameter in the reporting file has changed indicating the change in the production environment of the production server, sending by the script executing on the test server a notification about the change in the parameter; and in response to the notification, modifying a testing environment of the test server to correspond with the change in the production environment of the first production server, wherein the test application is executed in the modified testing environment of the test server.

16. The method of claim 15, wherein analyzing the log file comprises searching the log file for application error logs.

17. The method of claim 15, wherein analyzing the log file comprises searching the log file for application warning logs.

18. The method of claim 15, further comprising:
determining a data throughput of the server application; and
comparing the data throughput of the server application to a predefined data throughput threshold, wherein determining that the server application is qualified for deployment to the production environment is further based on comparing the data throughput of the server application to the predefined data throughput threshold.

19. The method of claim 18, wherein the predefined data throughput threshold is between 500 megabits per second data throughput and 2 gigabits per second data throughput.

20. The method of claim 15, wherein the server computer is executing in a shadow role before the outputs of the server computer are coupled to the production outputs.

* * * * *